(12) United States Patent
Kagramanyan

(10) Patent No.: US 10,390,613 B2
(45) Date of Patent: Aug. 27, 2019

(54) SECUREMENT APPARATUS AND METHODS OF USING SAME

(71) Applicant: Norik Kagramanyan, Pacoima, CA (US)

(72) Inventor: Norik Kagramanyan, Pacoima, CA (US)

( * ) Notice: Subject to any disclaimer, the term of this patent is extended or adjusted under 35 U.S.C. 154(b) by 0 days.

(21) Appl. No.: 15/472,176

(22) Filed: Mar. 28, 2017

(65) Prior Publication Data

US 2017/0314599 A1 Nov. 2, 2017

Related U.S. Application Data

(60) Provisional application No. 62/328,537, filed on Apr. 27, 2016.

(51) Int. Cl.
*A47B 47/00* (2006.01)
*A47B 97/00* (2006.01)
*A47B 95/00* (2006.01)
*F16B 12/20* (2006.01)

(52) U.S. Cl.
CPC .......... *A47B 47/0075* (2013.01); *A47B 97/00* (2013.01); *A47B 95/00* (2013.01); *A47B 2220/0061* (2013.01); *A47B 2230/07* (2013.01); *F16B 12/20* (2013.01)

(58) Field of Classification Search
CPC ..... A47B 77/02; A47B 96/06; A47B 47/0075; F16B 12/10; F16B 12/20; E04F 21/185; Y10S 269/904; E04G 21/1841
USPC ............................. 248/544, 300, 500; 24/570
See application file for complete search history.

(56) References Cited

U.S. PATENT DOCUMENTS

| 2,435,288 A | * | 2/1948 | Nisenson | E06B 9/307 160/177 R |
| 2,770,271 A | * | 11/1956 | Kane | E04G 21/1891 269/203 |
| 3,343,329 A | * | 9/1967 | Pohutsky | E04B 9/22 165/49 |
| 3,544,049 A | * | 12/1970 | Franklin | F16L 3/23 248/231.41 |
| 3,664,628 A | * | 5/1972 | Noble | A47B 91/04 248/500 |
| 3,914,871 A | * | 10/1975 | Wolff | B23B 47/288 269/41 |
| 3,953,015 A | * | 4/1976 | Taylor | E04F 21/185 248/317 |

(Continued)

*Primary Examiner* — Bradley Duckworth
(74) *Attorney, Agent, or Firm* — Loza & Loza, LLP; Sevan Savsa

(57) ABSTRACT

A securement device that includes a main support having a top surface, and a vertical support having a rear surface, front surface, inner edge, and outer edge. The vertical support's inner edge couples to the main support's top surface such that the main support is orthogonal to the vertical support. The securement device further includes an auxiliary support having a top surface, bottom surface, and inner edge, where the auxiliary support's inner edge couples to the vertical support's outer edge such that the auxiliary support is orthogonal to the vertical support. The main support has a first side-edge that extends out beyond a first side-edge of the vertical support to define a first side-top surface of the main support, and a second side-edge that extends out beyond a second side-edge of the vertical support to define a second side-top surface of the main support.

18 Claims, 19 Drawing Sheets

(56) References Cited

U.S. PATENT DOCUMENTS

| | | | | |
|---|---|---|---|---|
| 4,250,601 | A * | 2/1981 | Ward | A47K 10/14 |
| | | | | 105/377.11 |
| 4,612,740 | A * | 9/1986 | Yamamoto | A47B 96/06 |
| | | | | 248/225.11 |
| 4,811,542 | A * | 3/1989 | Jewell | E04B 1/003 |
| | | | | 248/300 |
| 5,088,682 | A * | 2/1992 | Gibbs | B25B 1/2494 |
| | | | | 248/231.41 |
| 5,388,813 | A * | 2/1995 | Arsenault | B25B 5/101 |
| | | | | 269/155 |
| 5,653,079 | A * | 8/1997 | Loeffler | E04B 1/2608 |
| | | | | 403/396 |
| 5,676,486 | A * | 10/1997 | Keith | F16B 5/0614 |
| | | | | 248/300 |
| 6,155,547 | A * | 12/2000 | Gatanas | B25B 5/12 |
| | | | | 269/41 |
| 6,886,799 | B2 * | 5/2005 | Yamanashi | B60H 1/00535 |
| | | | | 248/300 |
| 7,007,903 | B2 * | 3/2006 | Turner | A47B 83/02 |
| | | | | 248/220.21 |
| 7,025,314 | B1 * | 4/2006 | Thomas | H02G 3/125 |
| | | | | 220/3.9 |
| 8,091,846 | B1 * | 1/2012 | Britner | B25H 1/00 |
| | | | | 248/219.3 |
| 8,950,721 | B2 * | 2/2015 | Kobayashi | F16M 13/02 |
| | | | | 248/500 |
| 9,770,122 | B2 * | 9/2017 | Gonzalez | A47B 57/565 |
| 2005/0224683 | A1 * | 10/2005 | Hirayu | B60R 16/04 |
| | | | | 248/500 |
| 2009/0173844 | A1 * | 7/2009 | Huo | H02G 3/32 |
| | | | | 248/65 |
| 2010/0146903 | A1 * | 6/2010 | Ellis | E04B 2/7457 |
| | | | | 52/696 |

* cited by examiner

SECUREMENT APPARATUS AND METHODS OF USING SAME

CLAIM OF PRIORITY

The present application for patent claims priority to U.S. Provisional Patent Application No. 62/328,537 entitled "SECUREMENT APPARATUSES" filed Apr. 27, 2016, the entire disclosure of which is hereby expressly incorporated by reference herein.

BACKGROUND

Technical Field

Various embodiments of the present disclosure pertain generally to securement apparatuses, and more specifically to securement apparatuses that help temporarily secure and align cabinets, closets, shelves, drawers, etc. or components thereof during installation.

Background Art

Installing cabinetry, closets, shelves, drawers, and components thereof is a difficult process that usually requires professional help. For example, typically multiple, skilled personnel is required to properly support, align, and secure wall-mounted cabinetry during installation. If special care is not applied, adjacent cabinets installed next to each other may be out of alignment and look and even function irregularly. As another example, drawers have multiple components, such as a drawer front panel, that needs to be secured to the front of the drawer. Doing so properly requires that the drawer front panel be aligned just right otherwise it may appear crooked relative to the drawer's body and even cause obstructions affecting its ability to open and close correctly. As other examples, installation of cabinet moldings and cabinet doors also typically require very special handling and care so that the moldings are cut and installed appropriately, and the cabinet doors are affixed to the cabinet body straight so they open and close without impediment.

These tasks typically require the help of multiple, skilled persons working together to support, align, and secure these components during installation. However, labor costs of employing multiple personnel and personnel safety concerns that inevitably arise when lifting heavy furniture components merit new and improved apparatuses and methods for installing such furniture efficiently and safely. Therefore, it is an object of the present disclosure to provide securement apparatuses and methods of using the same that aid in the installation of such furniture, including but not limited to cabinets, closets, drawers, shelves, etc., to decrease the number of people required, the time required, and improve overall safety of the installation.

SUMMARY

One feature provides a securement device adapted to secure cabinetry and drawers during installation. The securement device comprises a main support having a top surface, and a vertical support having a rear surface, a front surface, an inner edge, and an outer edge. The vertical support's inner edge couples to the main support's top surface such that the main support is substantially orthogonal to the vertical support. The securement device also comprises an auxiliary support having a top surface, a bottom surface, and an inner edge, where the auxiliary support's inner edge couples to the vertical support's outer edge such that the auxiliary support is substantially orthogonal to the vertical support. Moreover, the main support has a first side-edge that extends out beyond a first side-edge of the vertical support to define a first side-top surface of the main support, and the main support has a second side-edge that extends out beyond a second side-edge of the vertical support to define a second side-top surface of the main support. According to one aspect, the main support, the vertical support, and the auxiliary support are each substantially planar.

According to one aspect, the main support, the vertical support, and the auxiliary support are each substantially rectangular. According to another aspect, the main support's first side-edge and the main support's second side-edge are parallel edges of the substantially rectangular main support. According to yet another aspect, the vertical support's first side-edge and the vertical support's second side-edge are parallel edges of the substantially rectangular vertical support.

According to one aspect, the vertical support's first side-edge extends out beyond a first side-edge of the auxiliary support to define a first side-front surface of the vertical support, and the vertical support's second side-edge extends out beyond a second side-edge of the auxiliary support to define a second side-front surface of the vertical support. According to another aspect, the main support, the vertical support, and the auxiliary support are each substantially rectangular, and the vertical support's first side-edge and the vertical support's second side-edge are parallel edges of the substantially rectangular vertical support. According to yet another aspect, the auxiliary support's first side-edge and the auxiliary support's second side-edge are parallel edges of the substantially rectangular auxiliary support.

According to one aspect, the substantially planar main support is substantially parallel to the substantially planar auxiliary support, and the substantially planar main support and the substantially planar auxiliary support are both substantially orthogonal to the substantially planar vertical support. According to another aspect, the outer edge of the auxiliary support is substantially parallel to and spaced apart from a front edge of the main support, and a portion of the main support's top surface, the vertical support's front surface, and the auxiliary support's bottom surface together define a cavity having a rectangular cross-section. According to yet another aspect, the cavity having the rectangular cross-section is adapted to receive at least one of a cabinet edge, shelf edge, closet edge, and/or a drawer edge.

According to one aspect, the vertical support's inner edge coupling to the main support's top surface divides the main support's top surface into substantially a rear-top surface and a front-top surface. According to another aspect, the auxiliary support overhangs above the front-top surface of the main support. According to yet another aspect, the securement device further comprises one or more tightening means coupled to at least one of the vertical support, the main support, and/or the auxiliary support. According to another aspect, the one or more tightening means is a fastener that passes through an opening at the auxiliary support.

Another feature provides a securement device adapted to secure cabinetry and drawers during installation, the securement device comprising a substantially planar main support having a top surface, a substantially planar vertical support having a first surface, a second surface, a first edge, and a second edge, the vertical support's first edge coupling to the main support's top surface such that the main support's top surface is substantially orthogonal to the vertical support's first and second surfaces, a substantially planar auxiliary support having a first surface, a second surface, and a first edge, the auxiliary support's first edge coupling to the vertical support's second edge such that the auxiliary support's first and second surfaces are substantially orthogonal to the vertical support's first and second surfaces, and wherein the main support's top surface includes a first side-top surface in between a first side-edge of the main support and a first side-edge of the vertical support, and the main support's top surface further includes a second side-top surface in between a second side-edge of the main support and a second side-edge of the vertical support.

According to one aspect, the vertical support's second surface includes a first side-front surface in between the vertical support's first side-edge and a first side-edge of the auxiliary support, and the vertical support's second surface includes a second side-front surface in between the vertical support's second side-edge and a second side-edge of the auxiliary support. According to another aspect, the main support's first side-edge extends out beyond the auxiliary support's first side-edge by at least 0.75 inches, the main support's second side-edge extends out beyond the auxiliary support's second side-edge by at least 0.75 inches, and the main support's top surface is spaced apart from the auxiliary support's second surface by at least 0.75 inches.

Another feature provides a securement device adapted to secure cabinetry and drawers during installation, the securement device comprising a main support having a top surface, a vertical support having a rear surface, a front surface, an inner edge, and an outer edge, the vertical support's inner edge coupling to the main support's top surface such that the main support is substantially orthogonal to the vertical support, an auxiliary support having a top surface, a bottom surface, and an inner edge, the auxiliary support's inner edge coupling to the vertical support's outer edge such that the auxiliary support is substantially orthogonal to the vertical support, and wherein the main support has a first side-edge that extends out beyond a first side-edge of the vertical support to define a first side-top surface of the main support, and the main support has a second side-edge that extends out beyond a second side-edge of the vertical support to define a second side-top surface of the main support, and wherein the vertical support's first side-edge extends out beyond a first side-edge of the auxiliary support to define a first side-front surface of the vertical support, and the vertical support's second side-edge extends out beyond a second side-edge of the auxiliary support to define a second side-front surface of the vertical support. According to one aspect, the main support's first side-edge extends out beyond the vertical support's first side-edge by at least 0.75 inches, the main support's second side-edge extends out beyond the vertical support's second side-edge by at least 0.75 inches, the vertical support's inner and outer edges are spaced apart substantially 0.75 inches, the vertical support's first side-edge extends out beyond the auxiliary support's first side-edge by at least 0.25 inches, and the vertical support's second side-edge extends out beyond the auxiliary support's second side-edge by at least 0.25 inches.

BRIEF DESCRIPTION OF THE DRAWINGS

FIG. 15 illustrates the securement device coupled to a cabinet edge. FIG. 16 illustrates the securement device coupled to the cabinet edge and further securing a cabinet molding.

FIG. 17 illustrates a front-view of a portion of a drawer undergoing installation. FIG. 18 illustrates a close up view of a portion of the drawer shown in FIG. 17. FIG. 19 illustrates the drawer with the front panel installed.

DETAILED DESCRIPTION

In the following description numerous specific details may be set forth in order to provide a thorough understanding of the invention. However, one skilled in the art would recognize that the invention might be practiced without these specific details. In other instances, well known methods, procedures, and/or components have not been described in detail so as not to unnecessarily obscure aspects of the invention. In the following description, certain terminology is used to describe certain features of one or more embodiments of the invention. For example, the term "exemplary" as used herein is defined as serving as one example or illustration.

Overview

One feature pertains to a securement device that may be used to temporarily secure cabinetry and drawers during installation. The securement device may include a main support having a top surface, and a vertical support having a rear surface, front surface, inner edge, and outer edge. The vertical support's inner edge couples to the main support's top surface such that the main support is substantially orthogonal to the vertical support. The securement device may further include an auxiliary support having a top surface, bottom surface, and inner edge, where the auxiliary support's inner edge couples to the vertical support's outer edge such that the auxiliary support is substantially orthogonal to the vertical support. The main support may have a first side-edge that extends out beyond a first side-edge of the vertical support to define a first side-top surface of the main support, and a second side-edge that extends out beyond a second side-edge of the vertical support to define a second side-top surface of the main support.

Securement Apparatus

Figure 1:
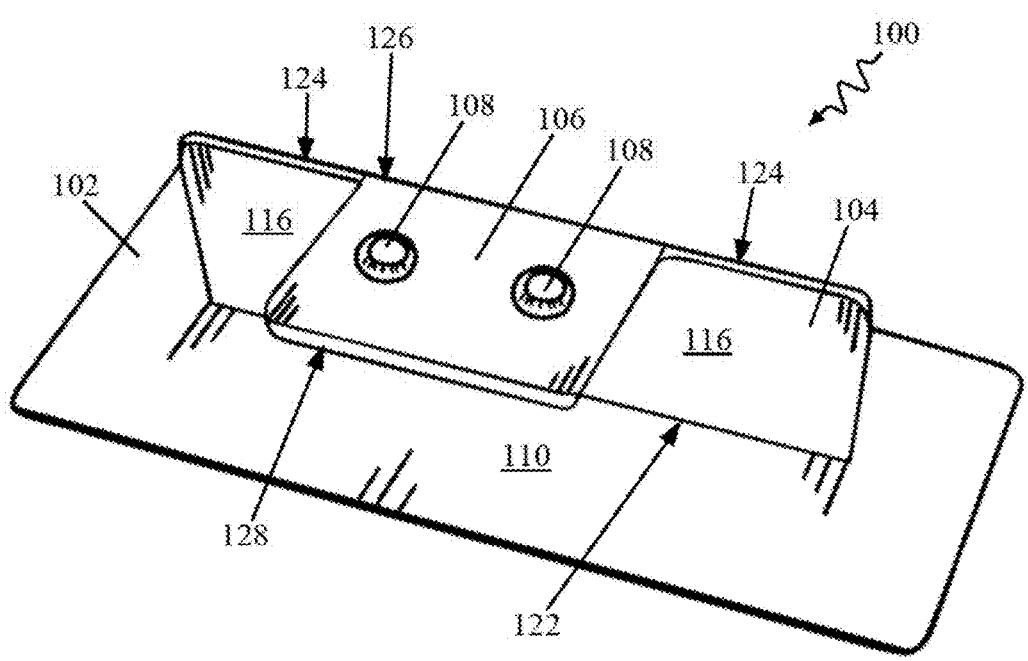
FIG. 1 illustrates a front perspective view of a securement device.
Figure 2:
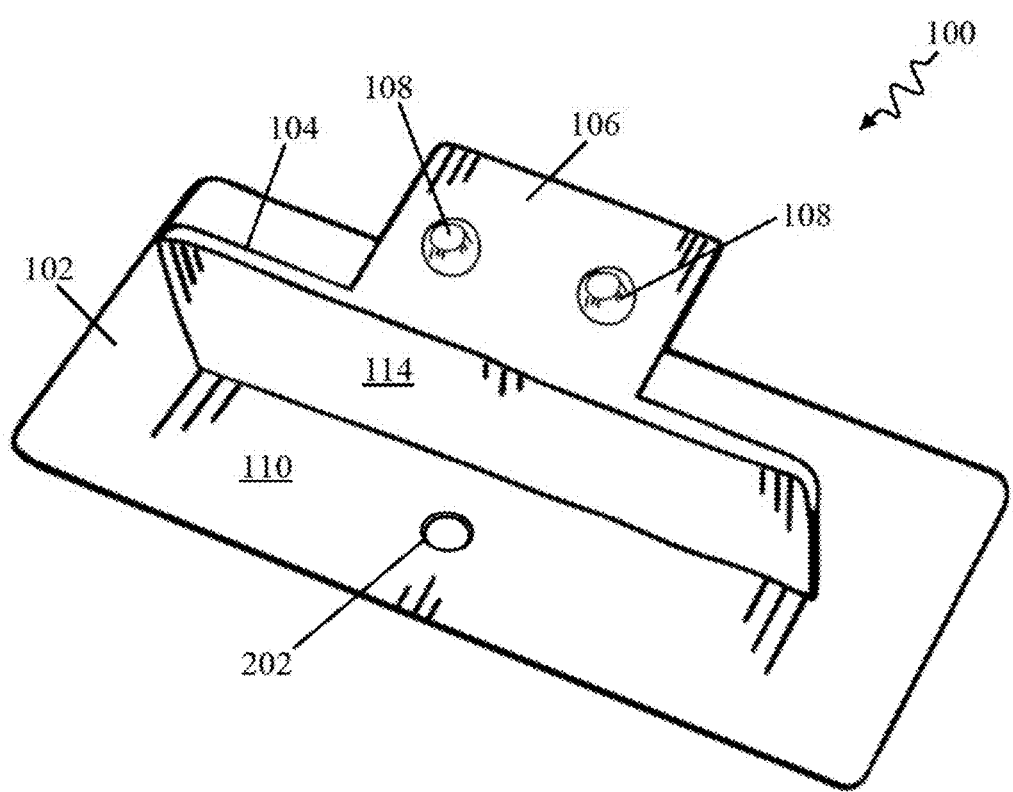
FIG. 2 illustrates the rear perspective view of the securement device.

FIGS. 1 and 2 illustrate a securement apparatus (e.g., also referred to herein as "securement device") 100 according to one aspect of the disclosure. Specifically, FIG. 1 illustrates a front perspective view, and FIG. 2 illustrates a rear perspective view of the securement device 100. In some non-limiting, non-exclusive applications, the securement device 100 may be utilized to temporarily align and secure various cabinetry and drawer components during installation and assembly. For example, the securement device 100 may be used to temporarily align and secure drawer front panels (e.g., drawer faces), cabinet moldings, cabinet doors, and wall mounted cabinets. While temporarily secured by the securement device 100, such drawer and cabinet components may then be secured using more permanent and traditional means such as screws, nails, bolts, glue, or other fastening means.

According to one aspect, the securement device 100 includes a main support (e.g., also referred to herein as "first member") 102, a vertical support (e.g., also referred to herein as "second member") 104, and an auxiliary support (e.g., also referred to herein as "third member") 106. The securement device 100 may also include one or more tightening means 108 (e.g., screws, bolts, etc.). In the example illustrated in FIG. 1, the securement device 100 includes a pair of tightening means 108 positioned at or through the auxiliary support 106.

Referring to FIGS. 1 and 2, the main support 102 includes a top surface 110. The vertical support may include a rear surface (e.g., also referred to herein as "vertical support's first surface") 114 and a front surface (e.g., also referred to herein as "vertical support's second surface") 116. The vertical support 104 includes an inner edge (e.g., also referred to herein as "vertical support's first edge") 122 that couples to the main support's top surface 110. The vertical support 104 also includes an outer edge (e.g., also referred to herein as "vertical support's second edge") 124 that couples to an inner edge (e.g., also referred to herein as "auxiliary support's first edge") 126 of the auxiliary support 106. The auxiliary support's inner edge 126 is opposite to its outer edge (e.g., also referred to herein as "auxiliary support's second edge") 128.

Figure 3:
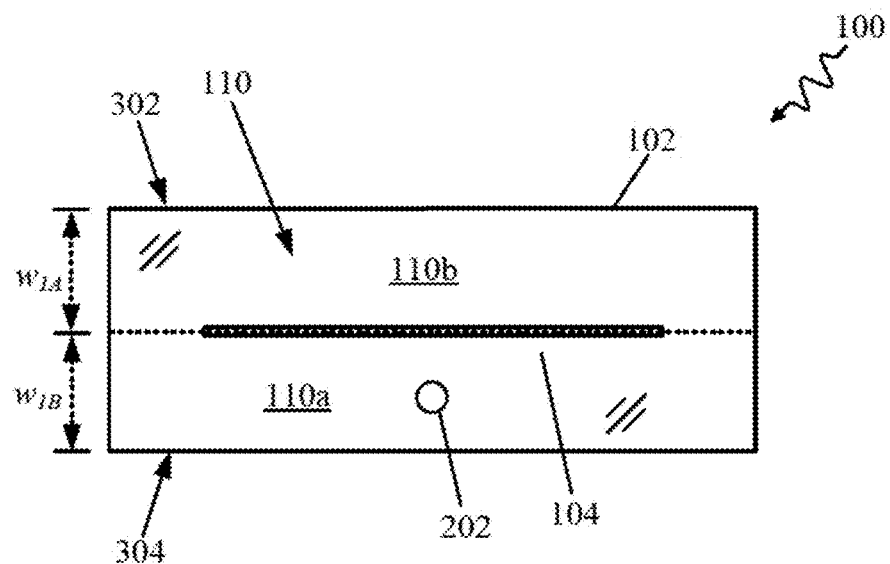
FIG. 3 illustrates a top view of the securement device with the auxiliary support removed.

FIG. 3 illustrates a top view of the securement device 100 with the auxiliary support 106 removed to provide a better view of the main support's top surface 110. The main support's top surface 110 is generally divided by the length of the vertical support 104 into a rear-top surface (e.g., also referred to herein as "main support's first surface") 110a and a front-top surface (e.g., also referred to herein as "main support's second surface") 110b. This division is illustrated with the dashed line in FIG. 3. Thus, the main support's first surface 110a is substantially the region of the top surface 110 that is on one side of the vertical support 104 that doesn't include the overhanging auxiliary support 106 (auxiliary support 106 shown in FIGS. 1 and 2). By contrast, the main support's second surface 110b is substantially the region of the top surface 110 that is on the other side of the vertical support 104 that does include the overhanging auxiliary support 106. According to one aspect, the main support 102 (e.g., main support's rear-top surface 110a may include one or more holes or apertures 202. These holes or apertures 202 may be used to receive a fastener (e.g., screw, bolt, etc.) or drill bit to pass through main support 102 and allow the securement device 100 to be securely fastened to a cabinet or drawer's edge.

The distance between a front edge (e.g., also referred to herein as "main support's first edge") 302 of the main support 102 and the vertical support 104 may be width $w_{1A}$, and the distance between a rear edge (e.g., also referred to herein as "main support's second edge") 304 of the main support 102 and the vertical support 104 may be width $w_{1B}$. In some aspects like the example shown, the vertical support 104 may bisect the front surface 110 of the main support 102 so that width $w_{1A}$ is equal to width $w_{1B}$. In other aspects, the vertical support 104 may couple to the main support 102 offset from the centerline so that width $w_{1A}$ is longer than width $w_{1B}$. According to one non-limiting, non-exclusive example, the width $w_{1A}$ may range between 0.5 inches to 5.0 inches, and thus may be for instance about 0.75 inches. According to one non-limiting, non-exclusive example, the width $w_{1B}$ may range between 0.5 inches to 5.0 inches, and thus may be for instance about 0.75 inches.

Figure 4:
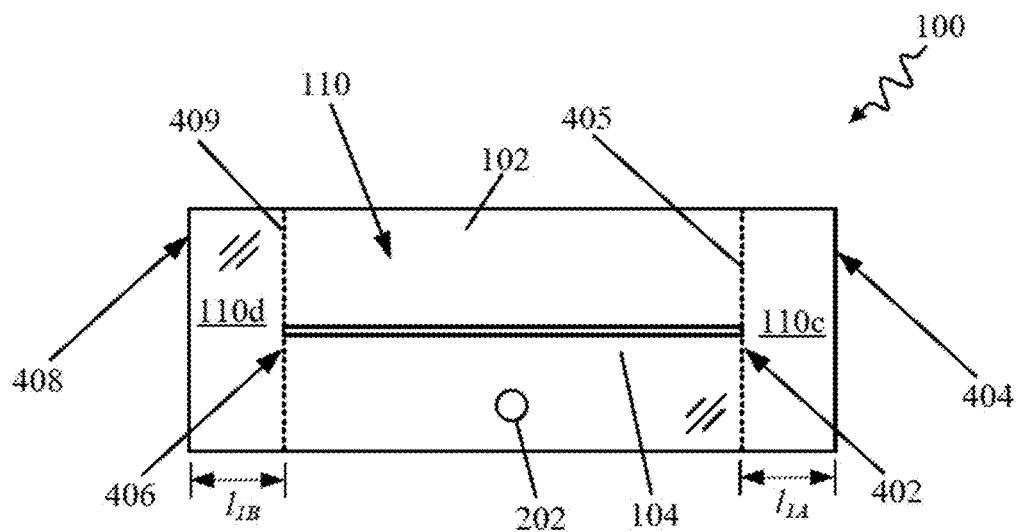
FIG. 4 illustrates a top view of the securement device with the auxiliary support removed, and includes additional markings.

FIG. 4 also illustrates a top view of the securement device 100 with the auxiliary support 106 removed to provide a better view of the main support's top surface 110. The main support's top surface 110 further includes a first side-top surface (e.g., also referred to herein as "main support's third surface") 110c and a second side-top surface (e.g., also referred to herein as "main support's fourth surface") 110d. The first side-top surface 110c may be defined as that region of the top surface 110 that is between a first side edge 402 of the vertical support 104 and a first side edge 404 of the main support 102 (e.g., region to the right of the dashed line 405). The second side-top surface 110d may be defined as that region of the top surface 110 that is between a second side edge 406 of the vertical support 104 and a second side edge 408 of the main support 102 (region to the left of the dashed line 409).

According to one aspect, the main support's first side-edge 404 may extend out beyond the vertical support's first side-edge 402 by a length $l_{1A}$, which may range from 0.25 inches to 3.0 inches. According to one non-limiting, non-exclusive example, the length $l_{1A}$ may be about 0.25 inches, 0.50 inches, 0.75 inches, or 1.0 inches. According to another aspect, the main support's second side-edge 408 may extend out beyond the vertical support's second side-edge 406 by a length $l_{1B}$, which may range from 0.25 inches to 3.0 inches. According to one non-limiting, non-exclusive example, the length $l_{1A}$ may be about 0.25 inches, 0.50 inches, 0.75 inches, or 1.0 inches. According to one aspect, the vertical support 104 is positioned centrally onto the main support 102 so that the lengths $l_{1A}$ and $l_{1B}$ are substantially the same.

Figure 5:
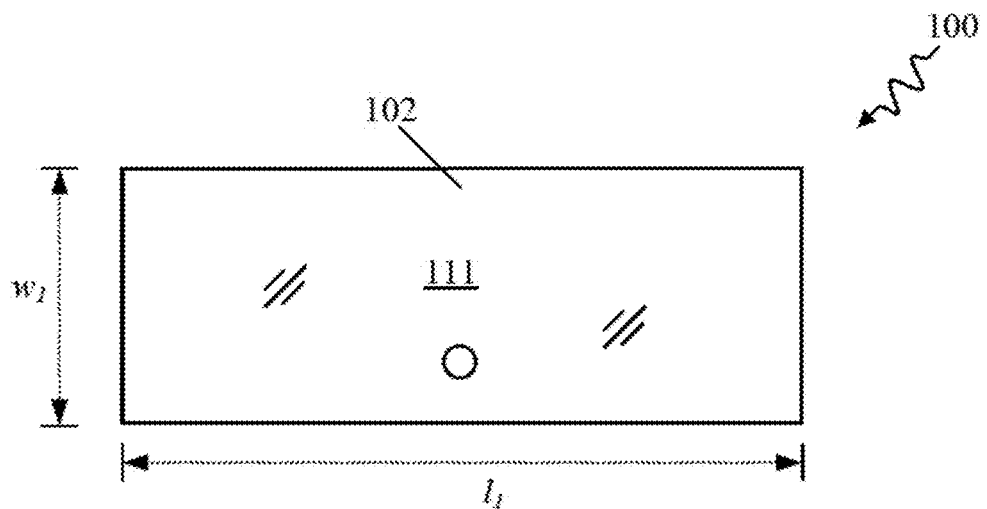
FIG. 5 illustrates a bottom view of the securement device.

FIG. 5 illustrates a bottom view of the securement device 100 according to one aspect. The main support 102 may also include a bottom surface 111 opposite the top surface 110

(see FIG. 4). The main support 102 has a length $l_1$ and a width $w_1$. According to one non-limiting, non-exclusive example, the length $l_1$ may be between 2 inches and 10 inches, and the width $w_1$ may be between 0.5 inches and 5 inches. According to one aspect, the length $l_1$ is about 3 to 4 inches (e.g., 3.5 inches) and the width $w_1$ is about 1 to 2 inches (e.g., 1.5 inches).

Figure 6:
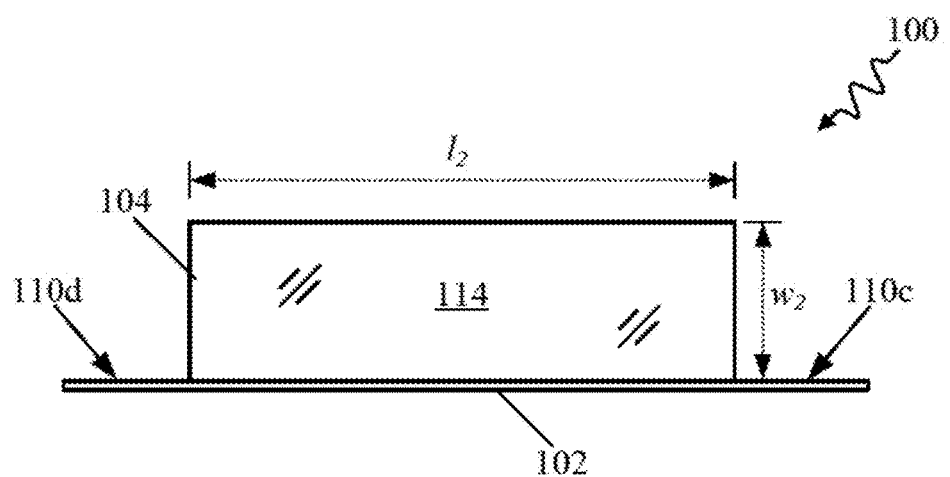
FIG. 6 illustrates a rear view of the securement device.

FIG. 6 illustrates a rear view of the securement device 100 according to one aspect. As described above, the vertical support 104 includes a rear surface 114. The vertical support 104 has a length $l_2$ and a width $w_2$. According to one non-limiting, non-exclusive example, the length $l_2$ may be between 1 inch and 8 inches, and the width $w_2$ may be between 0.25 inches and 3 inches. According to one aspect, the length $l_2$ is about 1.5 to 2.25 inches (e.g., 2 inches) and the width $w_2$ is about 0.75 inches, which may be approximately the thickness of a standard cabinet or drawer edge.

Figure 7:
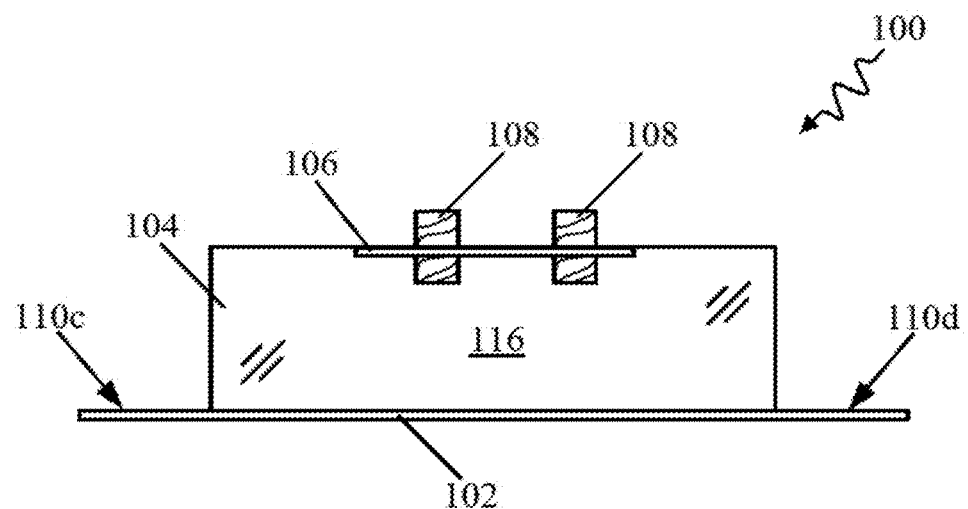
FIG. 7 illustrates a front view of the securement device.
Figure 8:
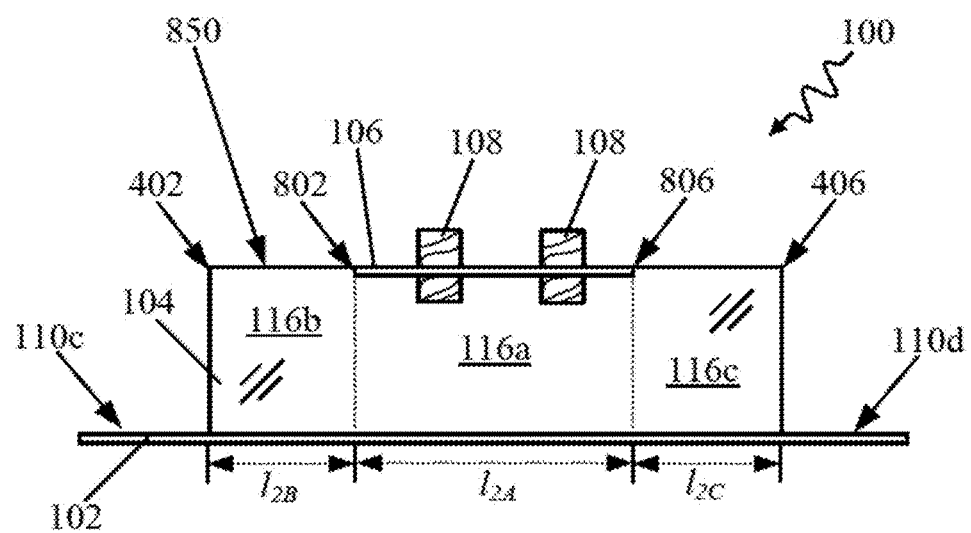
FIG. 8 illustrates a front view of the securement device with additional markings.

FIG. 7 illustrates a front view of the securement device 100 according to one aspect. As described above, the vertical support 104 includes a front surface 116. FIG. 8 also illustrates a front view of the securement device 100, and shows how the front surface 116 of the vertical support 104 may generally be divided into a main front surface 116a, a first side-front surface 116b, and a second side-front surface 116c as indicated by the dashed lines.

The main front surface 116a may have a length $l_{2A}$, the first side-front surface 116b may have a length $l_{2B}$, and the second side-front surface 116c may have a length $l_{2C}$. That is, the distance from a first side edge 802 of the auxiliary support 106 to the first side edge 402 of the vertical support 104 may be length $l_{2B}$, and the distance from a second side edge 806 of the auxiliary support 106 to the second side edge 406 of the vertical support 104 may be length $l_{2C}$. In some aspects, like the example illustrated in FIG. 8, the length $l_{2B}$ is equal to the length $l_{2C}$. The various surfaces 116a, 116b, and 116c may all have the same width $w_2$ (see FIG. 6).

Referring to FIG. 8, according to one non-limiting, non-exclusive example, the length $l_{2A}$ may be between 0.25 inches and 4 inches. For instance the length $l_{2A}$ may be about 0.5 inches, 0.75 inches, or 1 inch. According to another non-limiting, non-exclusive example, the length $l_{2B}$ may be between 0 inches and 4 inches. For instance the length $l_{2B}$ may be about 0.75 inches, which may be approximately the thickness of a standard cabinet or drawer edge. According to another non-limiting, non-exclusive example, the length $l_{2C}$ may be between 0 inches and 4 inches. For instance the length $l_{2C}$ may be about 0.75 inches, which may be approximately the thickness of a standard cabinet or drawer edge. According to one aspect, the auxiliary support 106 is positioned centrally onto the vertical support's outer edge 124 so that the lengths $l_{2B}$ and $l_{2C}$ are substantially the same.

Figure 9:
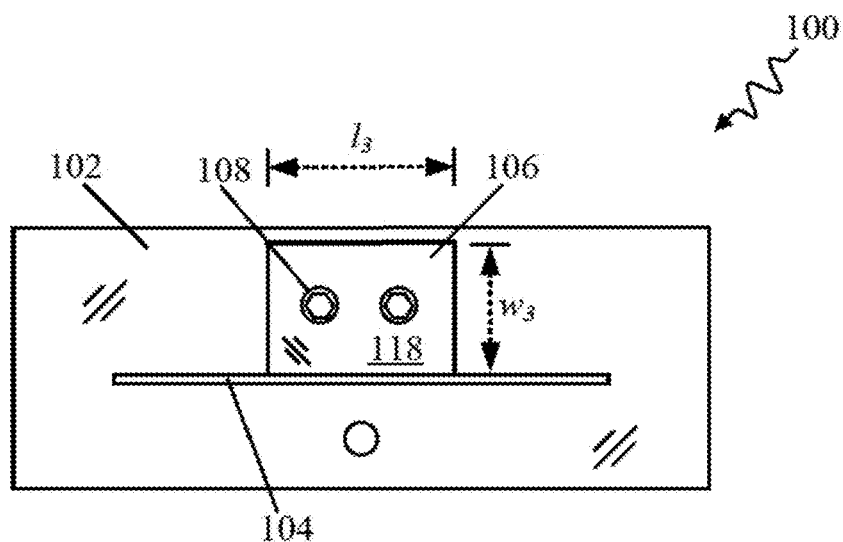
FIG. 9 illustrates a top view of the securement device.

FIG. 9 illustrates a top view of the securement device 100 according to one aspect. The auxiliary support 106 includes a top surface (e.g., also referred to herein as "auxiliary support's first surface") 118. The auxiliary support 106 has a length $l_3$ and a width $w_3$. Referring to FIGS. 8 and 9, the length $l_{2A}$ may be equal to the length $l_3$. According to one non-limiting, non-exclusive example, the width $w_3$ may range between 0.25 inches and 5 inches. For instance, the width $w_3$ may be about 0.5 inches, 0.75 inches, or 1 inch.

Figure 10:
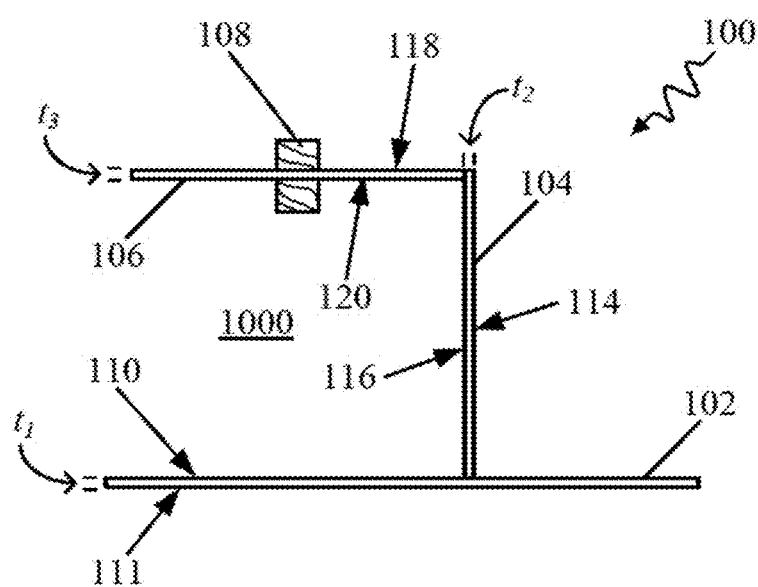
FIG. 10 illustrates a side view of the securement device.

FIG. 10 illustrates a side view of the securement device 100 according to one aspect. The auxiliary support 106 further includes a bottom surface (e.g., also referred to herein as "auxiliary support's second surface") 120 that is on the opposite side of the auxiliary support's top surface 118. Referring to FIGS. 9 and 10, the one or more tightening means 108 may be positioned at the auxiliary support 106, entering the auxiliary support 106 at its top surface 118 and exiting through its bottom surface 120. As explained in greater detail below, the tightening means 108 helps secure the securement device 100 to a cabinet or drawer edge that fits into the space 1000 formed by the main support's front-top surface 110b, the vertical support's front surface 116, and the auxiliary support's bottom surface 120. The tightening means may be, for example, screws, bolts, or some other means for tightening the securement device 100 to the cabinet or drawer's edge within the space 1000. In the illustrated example, the device 100 includes a pair of tightening means but in practice any number may be used include zero, one, three or more.

According to one aspect, the main support 102 may be substantially planar and have a thickness $t_1$ which may range from 0.01 inches to 0.33 inches. For instance, the thickness $t_1$ may be about 0.125 inches. According to another aspect, the vertical support 104 may be substantially planar and have a thickness $t_2$ which may range from 0.01 inches to 0.33 inches. For instance, the thickness $t_2$ may be about 0.125 inches. As another example, the thickness $t_2$ may approximate the space that is commonly found between cabinet door and the cabinet frame, which may range from 0.05 inches to 0.25 inches. According to yet another aspect, the auxiliary support 106 may be substantially planar and have a thickness $t_3$ which may range from 0.01 inches to 0.33 inches. For instance, the thickness $t_3$ may be about 0.125 inches. The main support 102, vertical support 104, and the auxiliary support 106 may be made of metal such aluminum, titanium, iron, steel, etc., but may also be made of wood, plastic, or other higher strength materials. Generally, the securement device 100 and its supports 102, 104, 106 may be rigid and strong and generally resilient to bending.

Referring to FIGS. 1 and 10, the main support 102 may be substantially orthogonal to the vertical support 104, which is in turn may be substantially orthogonal to the auxiliary support 106. Accordingly, the main support's first, second, third, fourth, and bottom surfaces 110a, 110b, 110c, 110d, 111 may all be substantially orthogonal to the vertical support's first and second surfaces 114, 116, which may be in turn substantially orthogonal to the auxiliary support's first and second surfaces 118, 120. Thus, the first and second surfaces 118, 120 of the auxiliary support 106 may be substantially parallel to the first, second, third, fourth, and bottom surfaces 110a, 110b, 110c, 110d, 111 of the main support 102. Referring to FIGS. 1, 3, and 10, according to one aspect, the outer edge 128 of the auxiliary support 106 is substantially parallel to and spaced apart from a front edge 302 of the main support 102, and a portion of the main support's top surface 110b, the vertical support's front surface 116, and the auxiliary support's bottom surface 120 together define a cavity 1000 having a rectangular cross-section. In one example, the cavity 1000 having the rectangular cross-section is adapted to receive at least one of a cabinet edge, shelf edge, closet edge, and/or a drawer edge.

Figure 11:
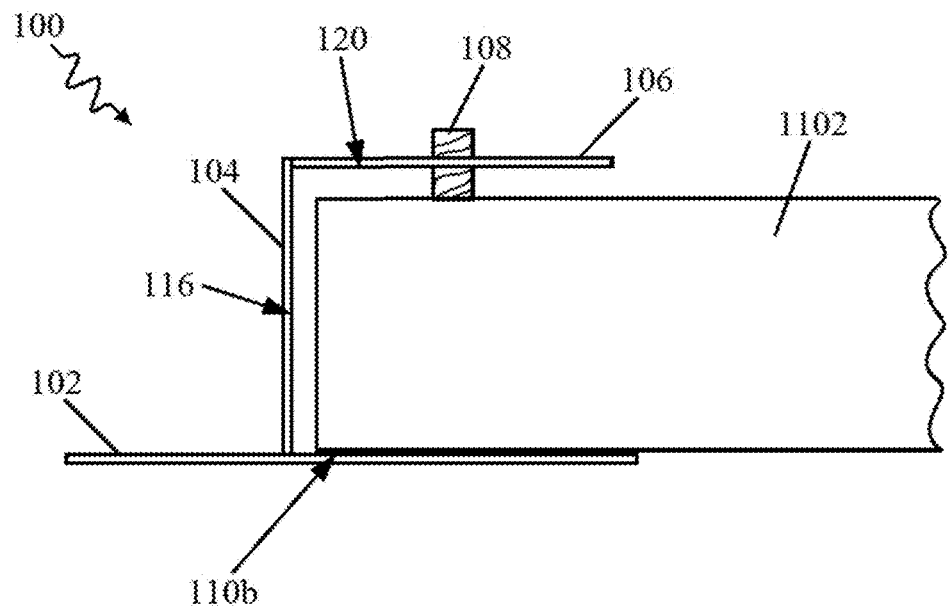
FIG. 11 illustrates how the securement device may be used to secure to a cabinet or drawer edge.

FIG. 11 illustrates how the securement device 100 may be used to secure to a cabinet or drawer edge 1102 according to one aspect. Referring to FIGS. 10 and 11, the securement device 100 is placed onto the cabinet or drawer edge 1102 by fitting the edge 1102 into the space 1000 formed between the main, vertical, and auxiliary supports 102, 104, 106. Once inserted into the space 1000, the one or more tightening means 108 may be used to clamp down onto the cabinet or drawer edge 1102 to help lock the securement device 100 in place. In the example shown, the auxiliary support 106 includes the pair of tightening means 108. In other aspects of the disclosure, the main support 102 and/or the vertical support 104 may include a tightening means in addition to or instead of the pair of tightening means 108 positioned at the auxiliary member 106. For example, at least one or more of the main, vertical, and/or auxiliary supports 102, 104, 106 may include one or more tightening means 108.

Figure 12:
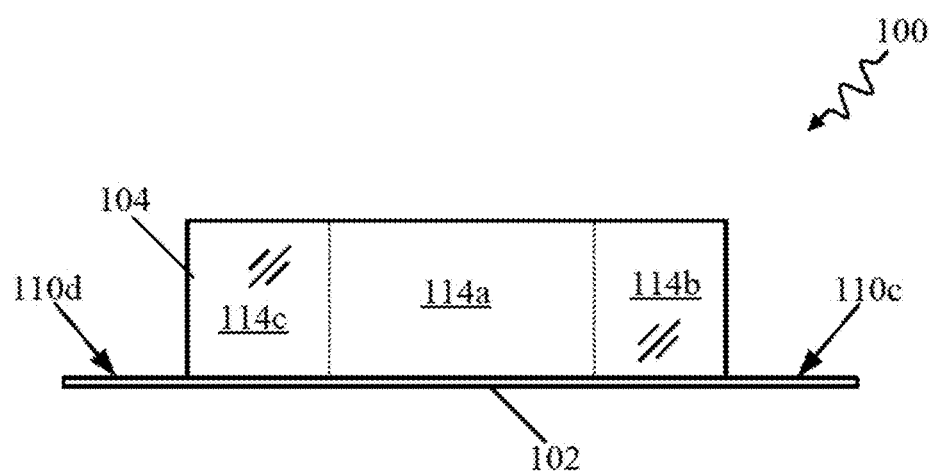
FIG. 12 illustrates a rear view of the securement device including additional markings.

FIG. 12 illustrates a rear view of the securement device 100 according to one aspect. As described above with respect to FIG. 6, the vertical support 104 includes a rear surface 114. According to one aspect, the vertical support's rear surface 114 may generally be divided into a main rear surface 114a, a first side-rear surface 114b, and a second side-rear surface 114c as indicated by the dashed lines. Referring to FIGS. 8 and 12, the vertical support's main rear surface 114a is on the opposite side of the vertical support's main front surface 116a, the vertical support's first side-rear surface 114b is on the opposite side of the vertical support's first side-front surface 116b, and the vertical support's second side-rear surface 114c is on the opposite side of the vertical support's second side-front surface 116c.

Figure 13:
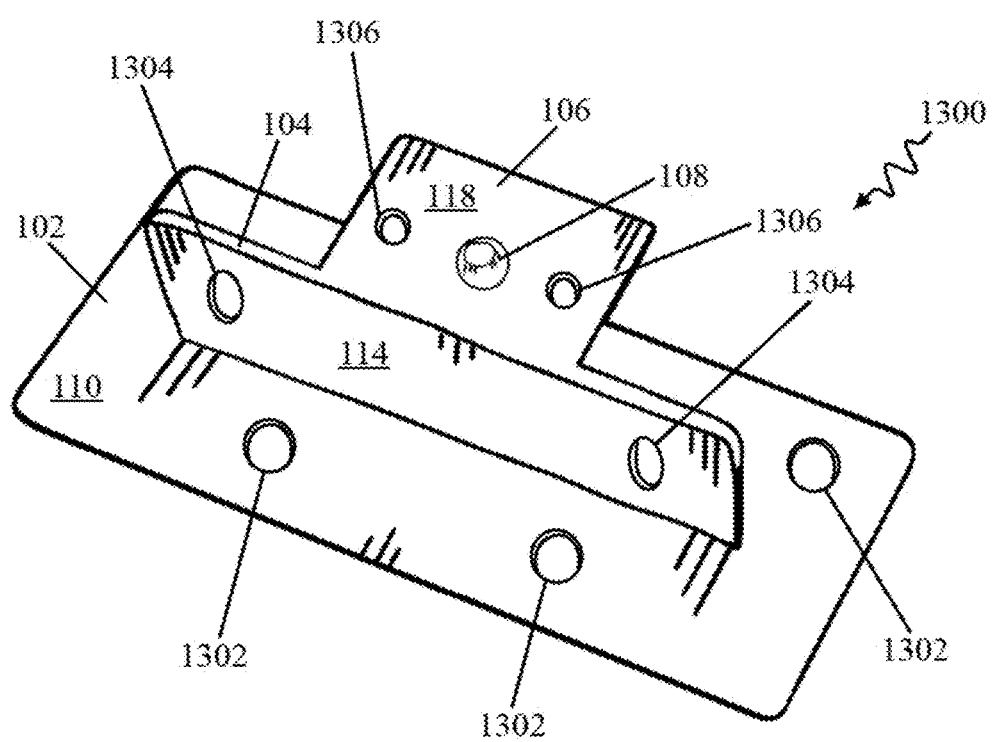
FIG. 13 illustrates a front perspective view of a second exemplary securement device.

FIG. 13 illustrates a securement device 1300 according to another aspect. The securement device 1300 shown in FIG. 13 is the same as those shown in FIGS. 1-12 except that the securement device 1300 of FIG. 13 may include a one or more holes or apertures in at least the main support 102, vertical support 104, and/or the auxiliary support 106. Specifically, the main support 102 may include one or more holes or apertures 1302, the vertical support 104 may include one or more holes or apertures 1304, and the auxiliary support 106 may include one or more holes or apertures 1306. The holes 1302, 1304, 1306 may be used to receive a fastener (e.g., screw, bolt, etc.) or drill bit to pass through the corresponding support 102, 104, 106 it is positioned on. The allows the securement device 1300 to be securely fastened to a cabinet or drawer's edge using fasteners or be used with a drill to create drill holes into the cabinet or drawer the securement device 1300 is affixed to. In the example illustrated in FIG. 13, the securement device 1300 includes a single tightening means 108 at the auxiliary support 106.

As described in greater detail below, in some aspects the securement device 100 may be secured to a cabinet or drawer edge by inserting the cabinet or drawer edge into the space found between the main support's front-top surface 110b and the auxiliary support's bottom surface 120. In some aspects, the side-top surfaces 110c, 110d of the main support 102 are adapted to temporarily support and align a cabinet in place as it is being permanently secured to a wall or other support structure. In some aspects, the rear-top surface 110a of the main support 102 and the rear surface 114 of the vertical support 104 are used to secure cabinetry molding to a cabinet while the molding is marked up for resurfacing. In some aspects, the rear-top surface 110a of the main support 102 and the rear surface 114 of the vertical support 104 are used to temporarily align and secure a drawer's front panel in place as it is being permanently secured to the drawer's front panel support. In some aspects, the rear-top surface 110a of the main support is used to temporarily align and secure a cabinet door in place as it is being permanently secured to a cabinet.

Figure 14:
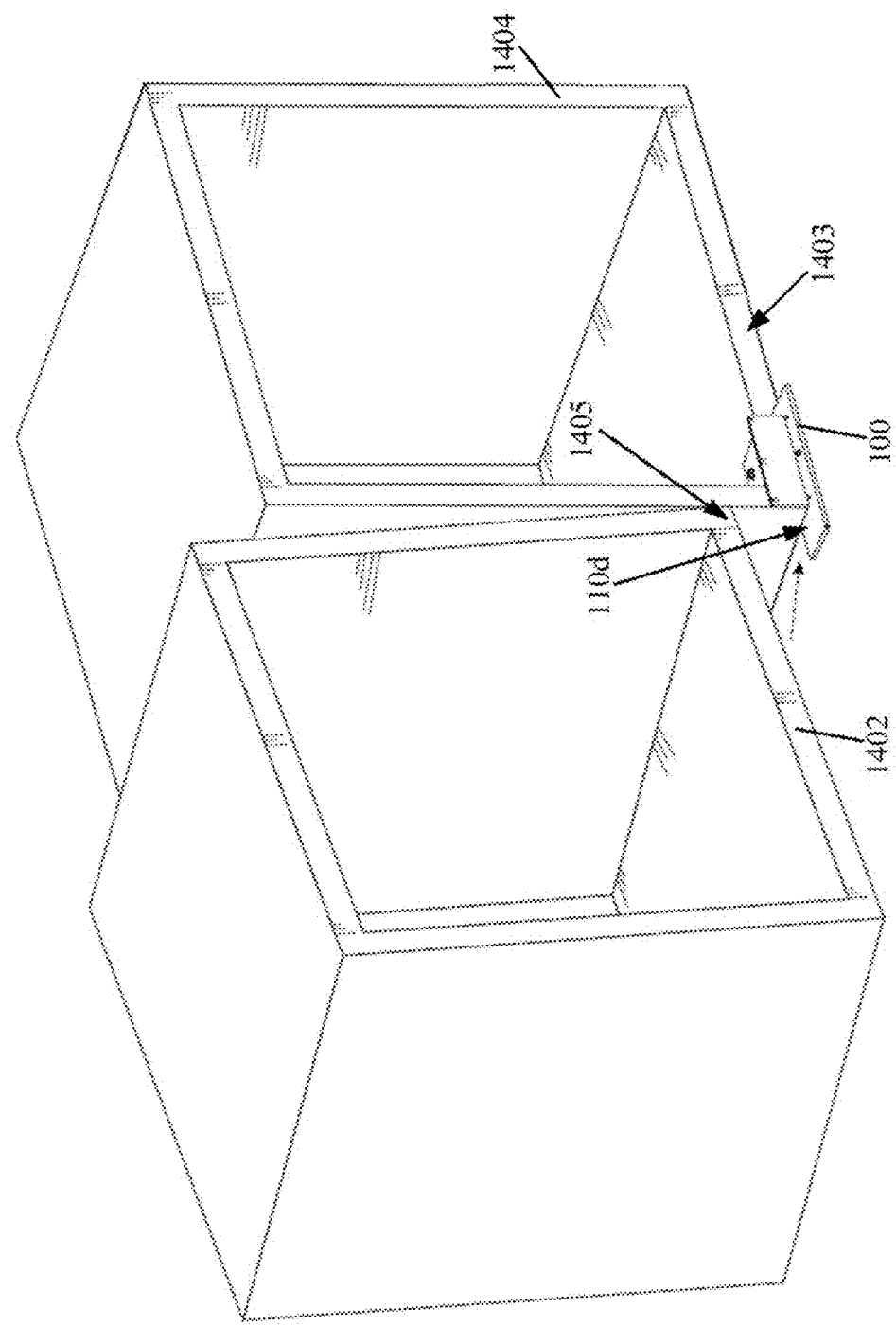
FIG. 14 illustrates a first exemplary application of the securement device used to align and secure a second cabinet.

FIG. 14 illustrates one non-exclusive, non-limiting application of the securement device 100. The securement device 100 may be used to temporarily align and secure a wall mountable cabinet 1402 to another existing cabinet 1404 that has already been mounted or otherwise secured. Referring to FIGS. 3, 4, 10, and 14, the main support's front-top surface 110b, the vertical support's front surface 116, and the auxiliary support's bottom surface 120 may all couple/engage to a bottom edge 1403 of a previously secured cabinet 1404. The tightening means 108 (e.g., fastener in one example) may be engaged to tightly secure the securement device 100 to the previously secured cabinet 1404. Then, the new cabinet 1402 to be installed may be brought closer (indicated by dashed arrow) and its bottom right corner 1405 may ultimately be positioned to rest on one of the main support's side-top surfaces (e.g., second side-top surface 110d so that the new cabinet 1402 is temporarily secured in place and accurately aligned with the previously secured cabinet 1404. The new cabinet 1402 may then be fastened to the wall behind it (not shown) and/or the other cabinet 1404 using more permanent and traditional fastening means (e.g., screws, etc.). Once the new cabinet 1402 is secured, the securement device 100 may be easily removed from the previously secure cabinet 1404. Accordingly, the securement device 100 may in one application be used to easily and quickly secure and align a new cabinet to be installed with an existing, previously secured cabinet 1404. In some case a single person can align and install the cabinet 1402 without needing help from others where traditionally more than one person would be needed to support and align the new cabinet 1402 while another person secured the new cabinet to the wall or existing cabinet 1404.

Figure 15:
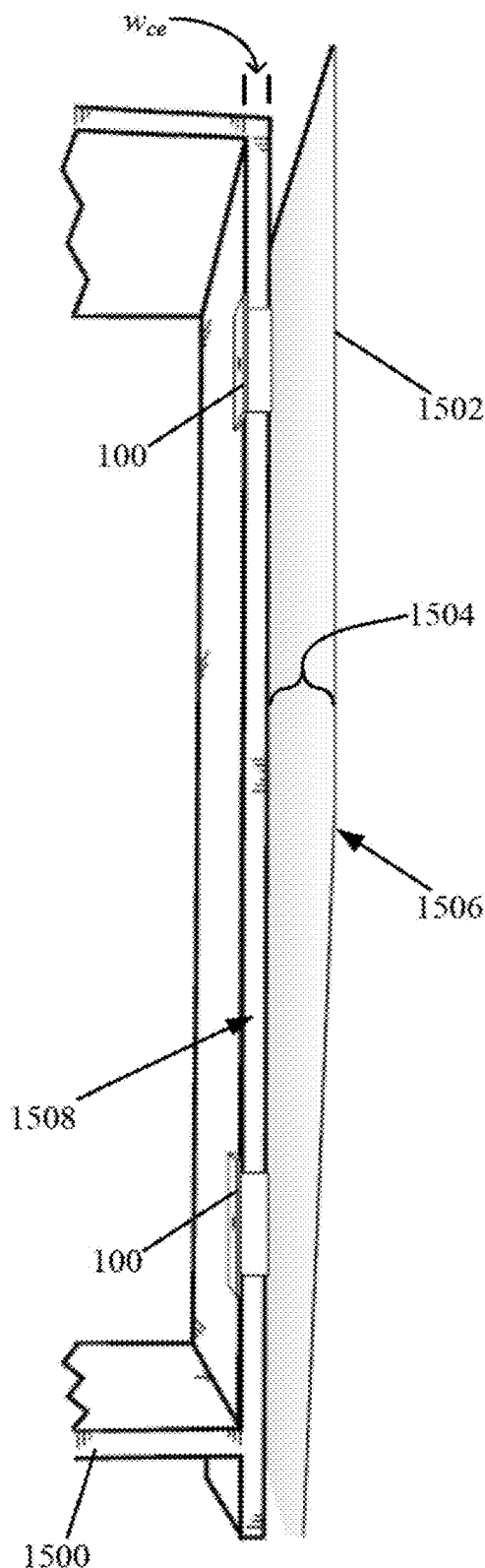
FIGS. 15-16 illustrate a second exemplary application of the securement device used to secure and install molding. Specifically.
Figure 16:
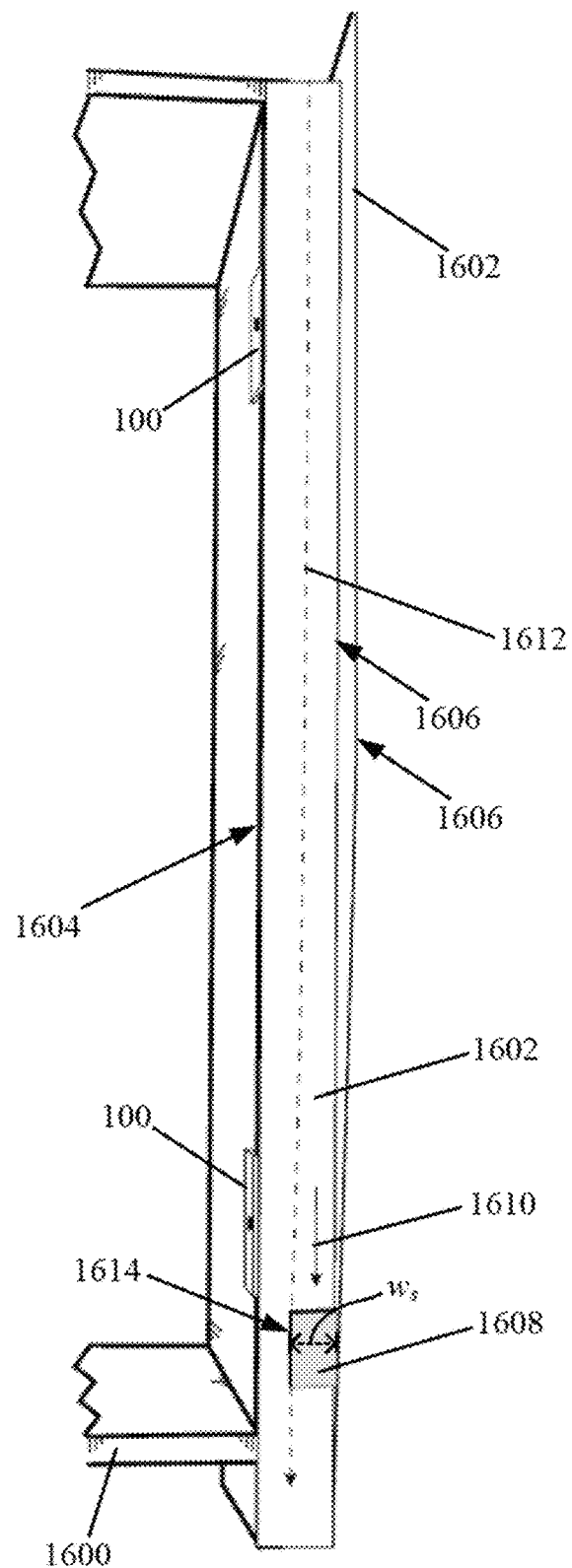

FIGS. 15-16 illustrate another non-exclusive, non-limiting application of the securement device 100. As will be explained with reference to FIGS. 15-16, the rear-top surface of the securement device's main support and the rear surface of its vertical support may be used to secure cabinetry molding to a cabinet while the molding is marked up for resurfacing. Referring to FIG. 15, a cabinet 1500 is shown that is already securely fastened in place to a wall or some other steadfast structure. Adjacent to the cabinet 1500 is a wall 1502 with an unsightly space 1504 existing in between. Generally it is desirable to cover such small spaces or gaps 1504 with aesthetically pleasing moldings (not shown in FIG. 15) that are cut to fit such spaces and match the cabinetry 1500 or wall 1502 nearby to help promote a clean, finished look.

Very often, however, walls, such as the wall 1502 next to the cabinet 1500 have an uneven, slightly warped surface 1506 that is not perfectly flat. As a result moldings fitted into the space 1504 must be custom cut to match the uneven surface 1506 of the wall 1502 that they will secure to. However, taking an ordinary rectangular molding and making a precision cut along one of its edges to match the exact contours of the uneven wall's surface 1506 is no easy task. The securement device 100, however, makes this process significantly easier.

As an initial step, one or more securement devices 100 may be secured to the cabinet's edge 1508 nearest the wall 1502. Referring to FIGS. 10, 11, and 15, the cabinet's edge 1508 may be fitted into the space 1000 between the auxiliary support 106 and the main support 102 so that it comes into contact with one or more of the main support's front-top surface 110b, the vertical support's front surface 116, and/or the auxiliary support's bottom surface 120. The securement devices 100 may be held in place by engaging (e.g., tightening) the tightening means 108 (e.g., see FIGS. 1 and 10) so that the tightening means 108 clamp down onto a surface of the cabinet edge 1508.

Referring to FIGS. 3, 15, and 16, a side molding 1602, having a general size and shape approximating the space 1504, is positioned into the space 1504 and secured between the securement devices 100 and the wall 1502. Specifically, the rear-top surfaces 110a of the securement devices' main supports 102 and the rear surfaces 114 of the securement devices' vertical supports 104 support the side 1604 of the molding 1602 while an opposite side 1606 of the molding 1602 abuts the wall 1502. According to one aspect, additional support may be provided by running fasteners (e.g., screws or bolts) through one or more holes 202, 1302 (see FIGS. 2 and 13) of the main supports 102 and through the molding's edge 1604 to further secure the molding 1602 to the securement devices 100.

Once the molding 1602 is secured into the space 1504, a spacer 1608 is placed against the wall 1502 and run down the length of the uneven wall 1502 (following directional arrow 1610). While the spacer 1608 is run down 1610 the length of the wall 1502, a marker (e.g., chalk, pen, pencil, etc.) is used to trace the path 1612 of the spacer's outer edge 1614. Since the spacer 1608 is pressed up against the wall's uneven surface 1506 while it is run down 1610 the wall's length, the resulting spacer's path traced 1612 follows the uneven, curved features of the wall's surface 1506. The molding 1602 may now be removed from the space 1504 and a jigsaw or other cutting mechanism may cut along the path traced 1612 to create a molding 1602 having a side edge that exactly mirrors and matches the curved, uneven surface 1506 of the wall 1502. The spacer 1608 has a width $w_s$ that approximates the width $w_{ce}$ of the cabinet edge, which may also be width $w_2$ of the vertical support 104. The spacer's width $w_s$ matching the width $w_{ce}$ or $w_2$ ensures that the path traced 1612 is spaced away from the wall 1502 the correct amount so that when the jigsaw is used to cut the path traced 1612, the resulting molding 1602 has a width that matches the width of the space 1504. The same process may be used to install molding above the cabinet 1500 between the cabinet 1500 and the ceiling (not shown), or another cabinet nearby (not shown), or below the cabinet 1500 between the cabinet 1500 and the floor (not shown).

Figure 17:
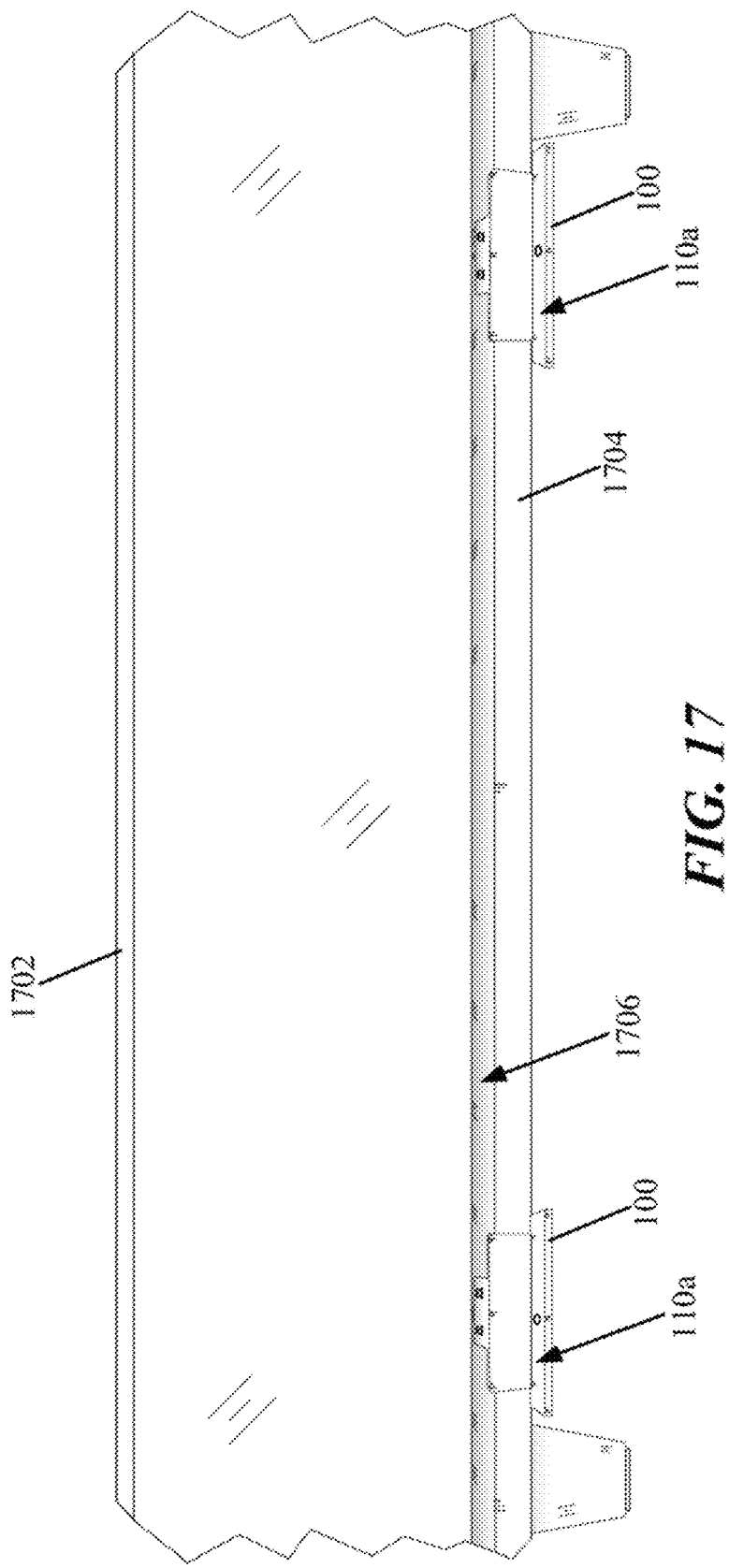
FIGS. 17-19 illustrate a third exemplary application of the securement device used to align and secure a front panel of a drawer. Specifically.
Figure 18:
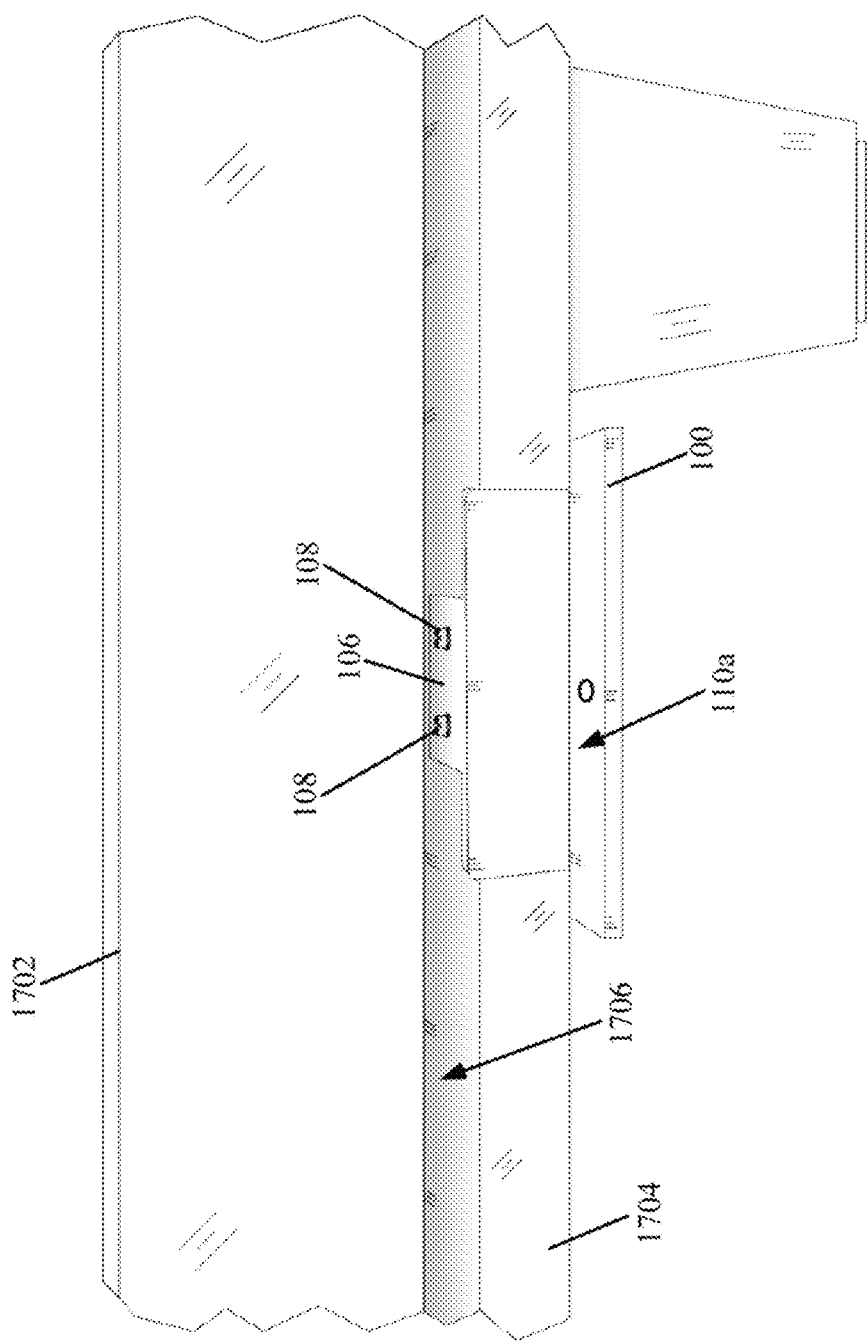
Figure 19:
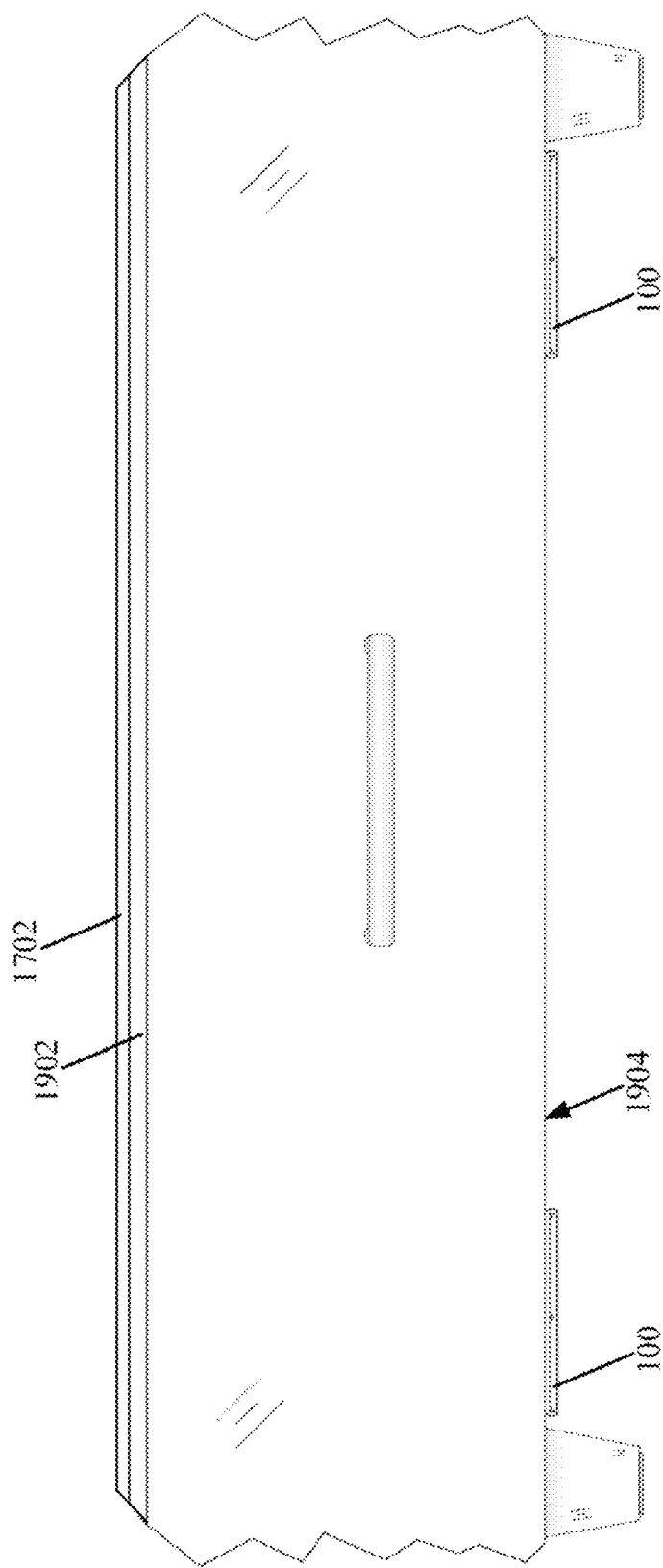

FIGS. 17-19 illustrate another non-exclusive, non-limiting application of the securement device 100. Specifically, FIG. 17 illustrates a front-view of a portion of a drawer 1700 undergoing installation. The drawer 1700 shown in FIG. 17 does not have a drawer front panel installed yet. FIG. 18 illustrates a close up view of a portion of the drawer 1700 shown in FIG. 17, and FIG. 19 illustrates the drawer 1700 with the front panel 1902 installed.

Referring to FIGS. 17-19, one or more securement devices 100 may be used to temporarily align, secure, and support a drawer's front panel (e.g., face) 1902 to a drawer's front support 1702 and/or bottom support edge 1704. First, one or more securement devices 100 may be affixed onto the drawer's bottom support edge 1704. In reference to FIGS. 10, 11, and 17, the drawer's bottom support edge 1704 may be fitted into the space 1000 between the auxiliary support 106 and the main support 102 so that it comes into contact with one or more of the main support's front-top surface 110b, the vertical support's front surface 116, and/or the auxiliary support's bottom surface 120. In so doing the securement devices' auxiliary supports 106 slide into a gap 1706 (see FIG. 18) that exists between drawer's bottom support edge 1704 and the drawer's front support 1702. The tightening means 108 (e.g., screws) may also be used to tightly secure the securement devices 100 to the bottom support edge 1704. Once the securement devices 100 are in place, the bottom portion/edge 1904 of the drawer's front panel 1902 may be placed to rest on the main supports' rear-top surfaces 110a (see FIGS. 18 and 19) so that the drawer's front panel 1902 is properly aligned to the drawer's front support 1702. In this fashion the securement devices 100 help support and secure the drawer's front panel 1902. Once temporarily supported and secured, the drawer's front panel 1902 may then be secured to the front support 1702 using more permanent means such as screws, bolts, glue, etc. After the drawer's front panel 1902 has been permanently secured, the securement devices 100 may be removed.

Figure 20:
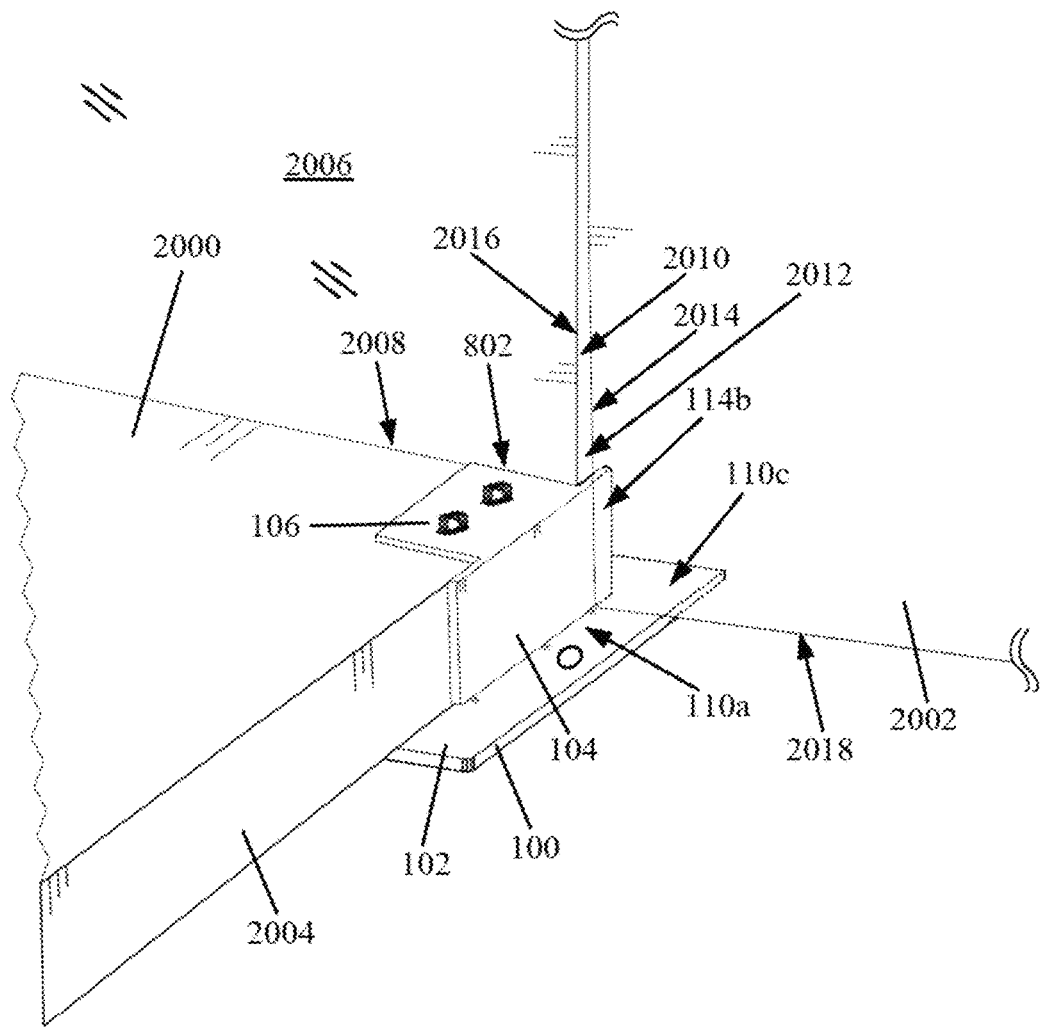
FIG. 20 illustrates a fourth exemplary application of the securement device.

FIG. 20 illustrates another non-exclusive, non-limiting application of the securement device 100. The securement device 100 may be used to temporarily support, secure, and align a cabinet's door 2002 while it is permanently secured to a cabinet 2000. First, a securement device 100 may be affixed onto the cabinet's bottom support edge 2004. In reference to FIGS. 10, 11, and 20, the cabinet's bottom support edge 2004 may be fitted into the space 1000 between the auxiliary support 106 and the main support 102 so that it comes into contact with one or more of the main support's front-top surface 110b, the vertical support's front surface 116, and/or the auxiliary support's bottom surface 120. The securement device 100 is positioned into the corner of the cabinet 2000 as shown so that its vertical support's first side-edge 802 comes into contact with a side-wall 2006 and side-wall bottom edge 2008 of the cabinet 2000. Moreover, doing so causes the vertical support's first side-front surface 116b (see FIG. 8) to contact or press against the cabinet's side-wall front surface 2010. Notably, referring to FIGS. 8, 10, and 20, a thickness $t_2$ of a portion 850 of the vertical support 106 that extends out beyond the first side-edge 802 of the auxiliary support 106 squeezes into and creates a spacing 2012 between the cabinet door's inner edge 2014 and the cabinet's side-wall side edge 2016.

Once the securement device 100 is secured into place at the corner of the cabinet 2000 as shown in FIG. 20, the cabinet door's bottom edge 2018 may be placed to rest on the main support's first side-top surface 110c and/or rear top surface 110a. Doing so aligns the cabinet door 2002 into the correct position and distance away from the cabinet's side-wall front surface 2010 to create an adequate spacing 2012 between the door 2002 and the cabinet's side-wall front surface 2010 so that the cabinet door 2002 may open and close properly once it is permanently secured to the cabinet 2000. Once the cabinet door 2002 is in place on the securement device 100 and aligned with the cabinet 2000, the cabinet door 2002 may be secured to the cabinet 2000 using more permanent means such as screws, bolts, glue, etc., and the securement device 100 may be removed.

Figure 21:
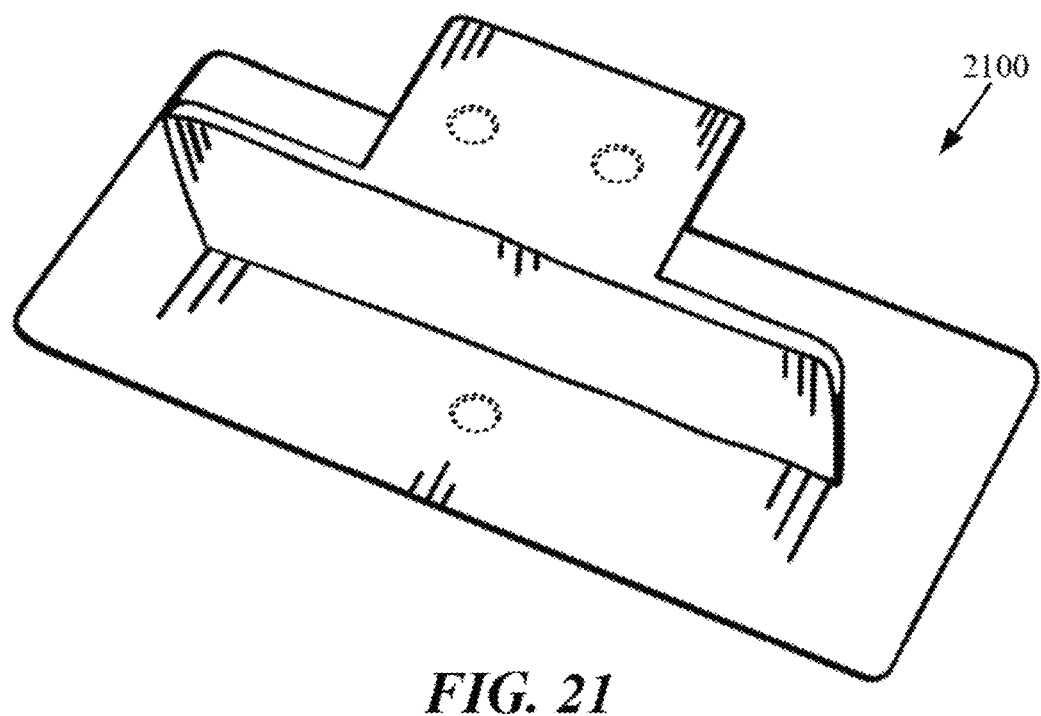
FIG. 21 illustrates a rear perspective view of a third exemplary securement device.

FIG. 21 illustrates a rear perspective view of a securement device 2100 according to one aspect.

Figure 22:
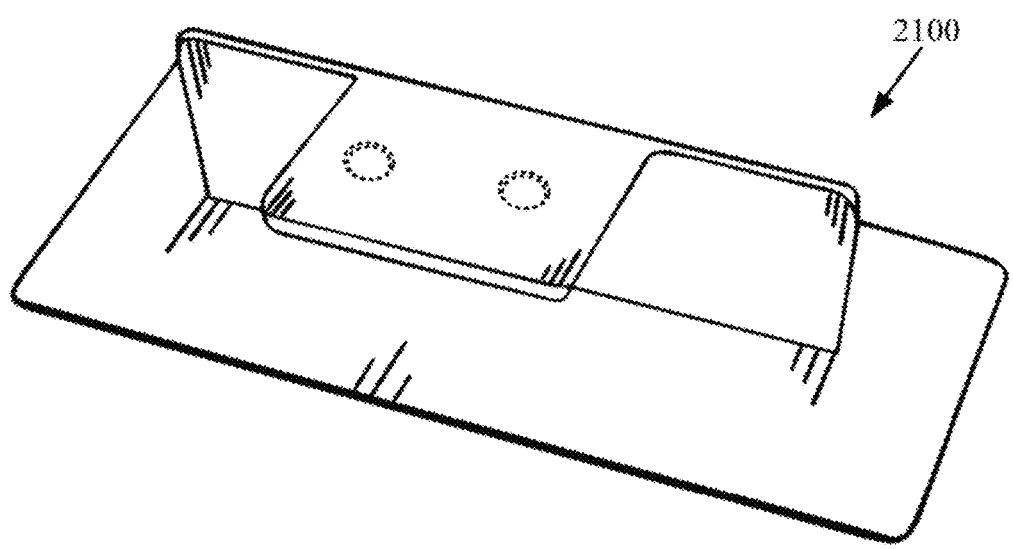
FIG. 22 illustrates a front perspective view of the third exemplary securement device.

FIG. 22 illustrates a front perspective view of the securement device 2100 according to one aspect.

Figure 23:
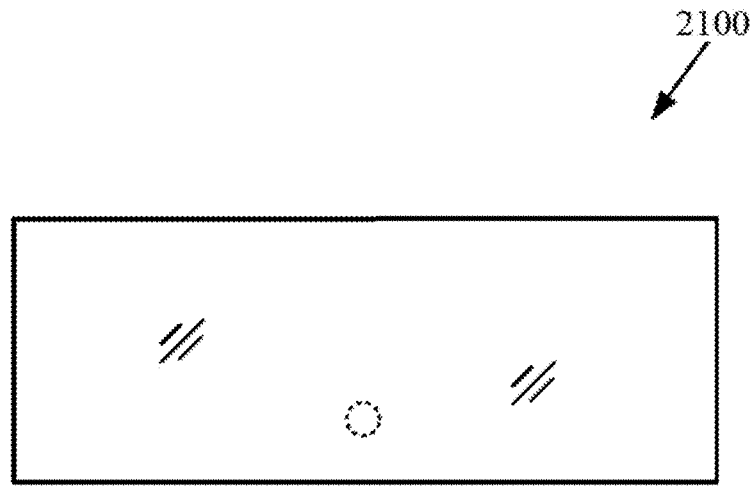
FIG. 23 illustrates a bottom view of the third exemplary securement device.

FIG. 23 illustrates a bottom view of the securement device 2100 according to one aspect.

Figure 24:
FIG. 24 illustrates a rear view of the third exemplary securement device.

FIG. 24 illustrates a rear view of the securement device 2100 according to one aspect.

Figure 25:
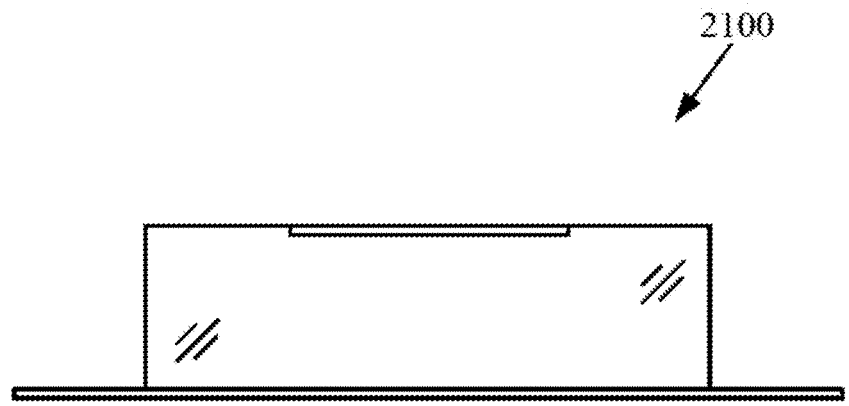
FIG. 25 illustrates a front view of the third exemplary securement device.

FIG. 25 illustrates a front view of the securement device 2100 according to one aspect.

Figure 26:
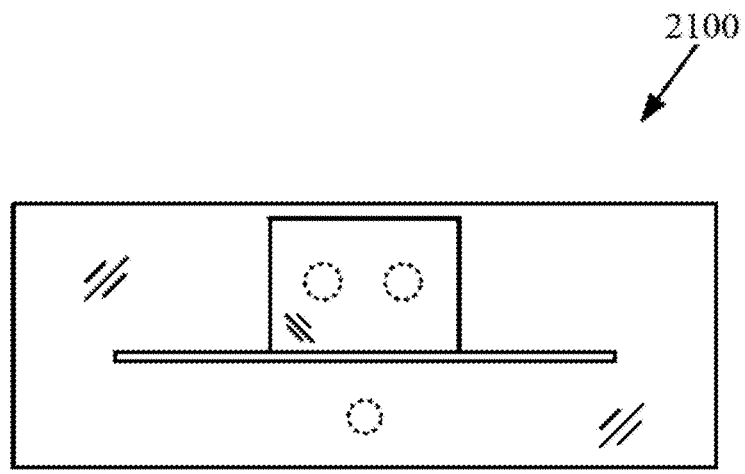
FIG. 26 illustrates a top view of the third exemplary securement device.

FIG. 26 illustrates a top view of the securement device 2100 according to one aspect.

Figure 27:
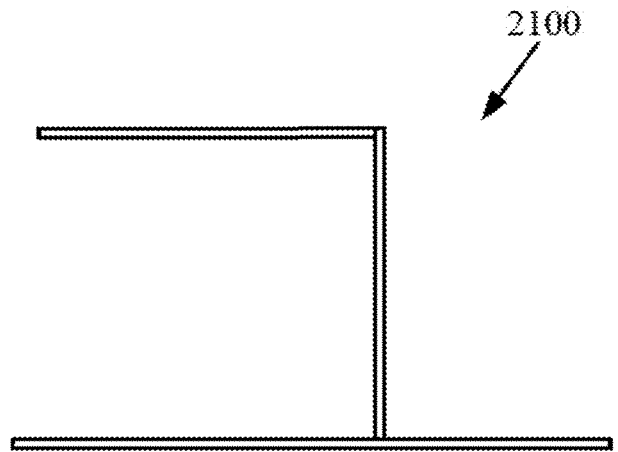
FIG. 27 illustrates a left-side view of the third exemplary securement device.

FIG. 27 illustrates a left-side view of the securement device 2100 according to one aspect.

Figure 28:
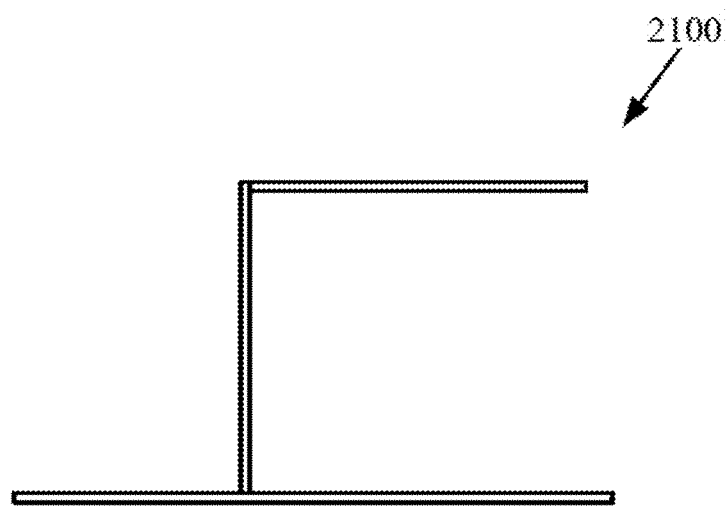
FIG. 28 illustrates a right-side view of the third exemplary securement device.

FIG. 28 illustrates a right-side view of the securement device 2100 according to one aspect.

One or more of the components, steps, features, and/or functions illustrated in FIGS. 1, 2, 3, 4, 5, 6, 7, 8, 9, 10, 11, 12, 13, 14, 15, 16, 17, 18, 19, 20, 21, 22, 23, 24, 25, 26, 27 and/or 28 may be rearranged and/or combined into a single component, step, feature or function or embodied in several components, steps, or functions. Additional elements, components, steps, and/or functions may also be added without departing from the invention.

The various features of the invention described herein can be used for different purposes not limited to cabinetry and drawer installation without departing from the invention. It should be noted that the foregoing embodiments of the disclosure are merely examples and are not to be construed as limiting the invention. The description of the embodiments of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A securement device adapted to secure cabinetry and drawers during installation, the securement device comprising:
 a main support having a top surface;
 a vertical support having a rear surface, a front surface, an inner edge, and an outer edge, the vertical support's inner edge coupling to the main support's top surface such that the main support is substantially orthogonal to the vertical support, wherein the front surface of the vertical support includes a main front surface, a first side-front surface, and a second side-front surface, and wherein the main front surface, the first side-front surface, and the second side-front surface are positioned on a same plane;
 an auxiliary support having a top surface, a bottom surface, and an inner edge, the auxiliary support's inner edge coupling to the vertical support's outer edge such that the auxiliary support is substantially orthogonal to the vertical support, and
 wherein the main support has a first side-edge that extends out beyond a first side-edge of the vertical support to define a first side-top surface of the main support, and the main support has a second side-edge that extends out beyond a second side-edge of the vertical support to define a second side-top surface of the main support, wherein at least one of the first side-top surface or the second side-top surface is configured to support and align a cabinet, a cabinet component, or a drawer component, wherein the first side-edge of the vertical support extends out beyond a first side-edge of the auxiliary support to define the first side-front surface of the vertical support, and the second side-edge of the vertical support extends out beyond a second side-edge of the auxiliary support to define the second side-front surface of the vertical support.

2. The securement device of claim 1, wherein the main support, the vertical support, and the auxiliary support are each substantially planar.

3. The securement device of claim 2, wherein the main support, the vertical support, and the auxiliary support are each substantially rectangular.

4. The securement device of claim 3, wherein the main support's first side-edge and the main support's second side-edge are parallel edges of the substantially rectangular main support.

5. The securement device of claim 4, wherein the vertical support's first side-edge and the vertical support's second side-edge are parallel edges of the substantially rectangular vertical support.

6. The securement device of claim 1, wherein the main support, the vertical support, and the auxiliary support are each substantially rectangular, and the vertical support's first side-edge and the vertical support's second side-edge are parallel edges of the substantially rectangular vertical support.

7. The securement device of claim 6, wherein the auxiliary support's first side-edge and the auxiliary support's second side-edge are parallel edges of the substantially rectangular auxiliary support.

8. The securement device of claim 2, wherein the substantially planar main support is substantially parallel to the substantially planar auxiliary support, and the substantially planar main support and the substantially planar auxiliary support are both substantially orthogonal to the substantially planar vertical support.

9. The securement device of claim 8, wherein an outer edge of the auxiliary support is substantially parallel to and spaced apart from a front edge of the main support, and a portion of the main support's top surface, the vertical support's front surface, and the auxiliary support's bottom surface together define a cavity having a rectangular cross-section.

10. The securement device of claim 9, wherein the cavity having the rectangular cross-section is adapted to receive at least one of a cabinet edge, shelf edge, closet edge, and/or a drawer edge.

11. The securement device of claim 1, wherein the vertical support's inner edge coupling to the main support's top surface divides the main support's top surface into substantially a rear-top surface and a front-top surface.

12. The securement device of claim 11, wherein the auxiliary support overhangs above the front-top surface of the main support.

13. The securement device of claim 1, further comprising:
 one or more tightening means coupled to at least one of the vertical support, the main support, and/or the auxiliary support.

14. The securement device of claim 13, wherein the one or more tightening means is a fastener that passes through an opening at the auxiliary support.

15. A securement device adapted to secure cabinetry and drawers during installation, the securement device comprising:
 a substantially planar main support having a top surface;
 a substantially planar vertical support having a first surface, a second surface, a first edge, and a second edge, the vertical support's first edge coupling to the main support's top surface such that the main support's top surface is substantially orthogonal to the vertical support's first and second surfaces, wherein the second surface of the vertical support includes a main front surface, a first side-front surface, and a second side-front surface, and wherein the main front surface, the first side-front surface, and the second side-front surface are positioned on a same plane;
 a substantially planar auxiliary support having a first surface, a second surface, and a first edge, the auxiliary support's first edge coupling to the vertical support's second edge such that the auxiliary support's first and second surfaces are substantially orthogonal to the vertical support's first and second surfaces, and
 wherein the main support's top surface includes a first side-top surface in between a first side-edge of the main support and a first side-edge of the vertical support, and the main support's top surface further includes a second side-top surface in between a second side-edge of the main support and a second side-edge of the vertical support, wherein at least one of the first side-top surface or the second side-top surface is configured to support and align a cabinet, a cabinet component, or a drawer component, wherein the first side-front surface is between the first side-edge of the vertical support and a first side-edge of the auxiliary support, and the second side-front surface is between the second side-edge of the vertical support and a second side-edge of the auxiliary support.

16. The securement device of claim 15, wherein the main support's first side-edge extends out beyond the auxiliary support's first side-edge by at least 0.75 inches, the main support's second side-edge extends out beyond the auxiliary support's second side-edge by at least 0.75 inches, and the main support's top surface is spaced apart from the auxiliary support's second surface by at least 0.75 inches.

17. A securement device adapted to secure cabinetry and drawers during installation, the securement device comprising:
 a main support having a top surface;
 a vertical support having a rear surface, a front surface, an inner edge, and an outer edge, the vertical support's inner edge coupling to the main support's top surface such that the main support is substantially orthogonal to the vertical support, wherein the front surface of the vertical support includes a main front surface, a first side-front surface, and a second side-front surface, and wherein the main front surface, the first side-front surface, and the second side-front surface are positioned on a same plane;
 an auxiliary support having a top surface, a bottom surface, and an inner edge, the auxiliary support's inner edge coupling to the vertical support's outer edge such that the auxiliary support is substantially orthogonal to the vertical support, wherein the auxiliary support includes an opening to enable a fastener to pass through the auxiliary support,
 wherein the main support has a first side-edge that extends out beyond a first side-edge of the vertical support to define a first side-top surface of the main support, and the main support has a second side-edge that extends out beyond a second side-edge of the vertical support to define a second side-top surface of the main support, wherein at least one of the first side-top surface or the second side-top surface is configured to support and align a cabinet, a cabinet component, or a drawer component, and
 wherein the vertical support's first side-edge extends out beyond a first side-edge of the auxiliary support to define the first side-front surface of the vertical support, and the vertical support's second side-edge extends out beyond a second side-edge of the auxiliary support to define the second side-front surface of the vertical support.

18. The securement device of claim 17, wherein the main support's first side-edge extends out beyond the vertical support's first side-edge by at least 0.75 inches, the main support's second side-edge extends out beyond the vertical support's second side-edge by at least 0.75 inches, the vertical support's inner and outer edges are spaced apart substantially 0.75 inches, the vertical support's first side-edge extends out beyond the auxiliary support's first side-edge by at least 0.25 inches, and the vertical support's second side-edge extends out beyond the auxiliary support's second side-edge by at least 0.25 inches.

* * * * *